US009626155B2

(12) United States Patent
Cammarota

(10) Patent No.: US 9,626,155 B2
(45) Date of Patent: Apr. 18, 2017

(54) DETERMINING RECOMMENDED OPTIMIZATION STRATEGIES FOR SOFTWARE DEVELOPMENT

(71) Applicant: QUALCOMM Incorporated, San Diego, CA (US)

(72) Inventor: Rosario Cammarota, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 19 days.

(21) Appl. No.: 14/698,454

(22) Filed: Apr. 28, 2015

(65) Prior Publication Data

US 2016/0321032 A1 Nov. 3, 2016

(51) Int. Cl.
*G06F 9/44* (2006.01)
*G06F 9/45* (2006.01)
*G06N 7/00* (2006.01)

(52) U.S. Cl.
CPC .............. *G06F 8/00* (2013.01); *G06F 8/41* (2013.01); *G06F 8/443* (2013.01); *G06N 7/00* (2013.01)

(58) Field of Classification Search
CPC .. G06F 8/00; G06F 8/44; G06F 8/443; G06N 7/00
USPC .......................................................... 717/100
See application file for complete search history.

(56) References Cited

U.S. PATENT DOCUMENTS

| | | | |
|---|---|---|---|
| 6,059,842 A * | 5/2000 | Dumarot | G06F 9/44505 706/47 |
| 7,263,692 B2 * | 8/2007 | Muthukumar | G06F 8/4452 717/150 |
| 2005/0050009 A1 * | 3/2005 | Gardner | G06Q 40/08 |
| 2006/0236310 A1 * | 10/2006 | Domeika | G06F 8/443 717/140 |
| 2008/0243735 A1 * | 10/2008 | Rish | G06N 5/003 706/17 |
| 2009/0271433 A1 * | 10/2009 | Perronnin | G06K 9/6224 |
| 2012/0203536 A1 * | 8/2012 | Gangemi | G06F 9/455 703/22 |

(Continued)

OTHER PUBLICATIONS

NPL-Book-Ullman-2012, Title: Mining of Massive Datasets, by Jure Leskovec, Anand Rajaraman, Jeff Ullman, 2012 located at http://infolab.stanford.edu/~ullman/mmds/ch11.pdf.*
NPL-Zhou-Low-rank and Sparse Matrix-2011, Article Titile: GoDec: Randomized Low-rank & Sparse Matrix Decomposition in Noisy Case, Appearing in Proceedings of the 28 th International Conference on Machine Learning, Bellevue,WA, USA, 2011. Copyright 2011.*

(Continued)

*Primary Examiner* — Wei Zhen
*Assistant Examiner* — Hossain Morshed
(74) *Attorney, Agent, or Firm* — Shumaker & Sieffert, P.A.

(57) ABSTRACT

In one example, a device for recommending an optimization strategy for software includes a memory storing data for a sparse matrix including empty cells and non-empty cells, wherein non-empty cells of the sparse matrix represent ratings for optimization strategies previously applied to programs, and one or more hardware-based processors configured to predict values for empty cells of a sparse matrix, fill the empty cells with the predicted values to produce a complete matrix, determine, for a current program that was not included in the programs of the sparse matrix, a recommended optimization strategy that yields a highest rating from the complete matrix, and provide an indication of the recommended optimization strategy.

24 Claims, 5 Drawing Sheets

(56) References Cited

U.S. PATENT DOCUMENTS

2014/0137264 A1* 5/2014 Bilogrevic .............. G06F 21/54
                                                            726/27
2014/0278721 A1* 9/2014 Giles ............... G06Q 10/06313
                                                           705/7.26

OTHER PUBLICATIONS

Puschel, et al., "SPIRAL: Code Generation for DSP Transforms," Proceedings of the IEEE, Feb. 2005, vol. 93 (2), pp. 232-275 [uploaded in parts].

Yang, et al., "Performance Optimization Using Partitioned SpMV on GPUs and Multicore CPUs," IEEE Transactions on Computers, Nov. 2014, 14 pp.

Fursin, "Collective Tuning Initiative: Automating and Accelerating Development and Optimization of Computing Systems," Proceedings of the GCC Developers' Summit, Jun. 14, 2009, XP055280860, 28 pp.

International Search Report and Written Opinion from International Application No. PCT/US2016/023725, dated Jun. 29, 2016, 14 pp.

Okatani, et al., "Efficient Algorithm for Low-rank Matrix Factorization with Missing Components and Performance Comparison of Latest Algorithms," Computer Vision (ICCV), 2011 IEEE International Conference on, IEEE, Nov. 6, 2011, pp. 842-849, XP032101277.

International Search Report and Written Opinion mailed Jul. 6, 2016 in international application No. PCT/US2016/023725 filed on Feb. 8, 2017, 5 pp.

\* cited by examiner

| | OPTIMIZATION STRATEGY 140A | OPTIMIZATION STRATEGY 140B | OPTIMIZATION STRATEGY 140C | OPTIMIZATION STRATEGY 140D |
|---|---|---|---|---|
| PROGRAM 142A | VALUE 144A | EMPTY CELL 146C | VALUE 144F | EMPTY CELL 146J |
| PROGRAM 142B | EMPTY CELL 146A | EMPTY CELL 146D | VALUE 144G | EMPTY CELL 146K |
| PROGRAM 142C | VALUE 144B | EMPTY CELL 146E | EMPTY CELL 146F | VALUE 144J |
| PROGRAM 142D | VALUE 144C | VALUE 144D | EMPTY CELL 146G | VALUE 144K |
| PROGRAM 142E | EMPTY CELL 146B | VALUE 144E | VALUE 144H | EMPTY CELL 146L |

OPTIMIZATION DATABASE
106

FIG. 3

DETERMINING RECOMMENDED OPTIMIZATION STRATEGIES FOR SOFTWARE DEVELOPMENT

TECHNICAL FIELD

This disclosure relates to software optimization.

BACKGROUND

Optimizing software programs occurs at a variety of stages of software development, and is based on a large number of parameters. For example, the parameters may include run-time features, compilation settings for a compiler used to compile software instructions for the program, tools available on the target computing platform (e.g., available processing cores, memory size, etc.), algorithms used in the program, data structures used in the program, or the like. In addition, the parameters can vary based on target platform for the program, developer goals (e.g., quality of output vs. speed of execution), and the like. In addition, with the development of new platforms and execution tools, selection of an optimization strategy is becoming increasingly difficult.

SUMMARY

In general, this disclosure describes techniques for optimizing software during development of the software. More particularly, these techniques include recommending an optimization strategy for a software program. In general, a software developer collects data representative of ratings for optimization strategies applied to previous programs. The collected data may be formed into a sparse matrix, including ratings at the intersections of programs and optimization strategies within the matrix for observed pairs of programs and optimization strategies and empty cells for unobserved pairs of programs and optimization strategies. The techniques may then include predicting values for the empty cells to form a complete matrix, and selecting an optimization strategy from the complete matrix for a new program.

In one example, a method includes predicting values for empty cells of a sparse matrix, wherein values of non-empty cells of the sparse matrix represent ratings for optimization strategies previously applied to programs, filling the empty cells with the predicted values to produce a complete matrix, determining, for a current program that was not included in the programs of the sparse matrix, a recommended optimization strategy that yields a highest rating from the complete matrix, and providing an indication of the recommended optimization strategy.

In another example, a device for recommending an optimization strategy for software includes a memory storing data for a sparse matrix including empty cells and non-empty cells, wherein values of the non-empty cells of the sparse matrix represent ratings for optimization strategies previously applied to programs, and one or more hardware-based processors configured to predict values for empty cells of a sparse matrix, fill the empty cells with the predicted values to produce a complete matrix, determine, for a current program that was not included in the programs of the sparse matrix, a recommended optimization strategy that yields a highest rating from the complete matrix, and provide an indication of the recommended optimization strategy.

In another example, a device for recommending an optimization strategy for software includes means for predicting values for empty cells of a sparse matrix, wherein values of non-empty cells of the sparse matrix represent ratings for optimization strategies previously applied to programs, means for filling the empty cells with the predicted values to produce a complete matrix, means for determining, for a current program that was not included in the programs of the sparse matrix, a recommended optimization strategy that yields a highest rating from the complete matrix, and means for providing an indication of the recommended optimization strategy.

In another example, a computer-readable storage medium has stored thereon instructions that, when executed, cause a processor to predict values for empty cells of a sparse matrix, wherein values of non-empty cells of the sparse matrix represent ratings for optimization strategies previously applied to programs, fill the empty cells with the predicted values to produce a complete matrix, determine, for a current program that was not included in the programs of the sparse matrix, a recommended optimization strategy that yields a highest rating from the complete matrix, and provide an indication of the recommended optimization strategy.

The details of one or more examples are set forth in the accompanying drawings and the description below. Other features, objects, and advantages will be apparent from the description and drawings, and from the claims.

BRIEF DESCRIPTION OF DRAWINGS

FIG. 3 is a block diagram illustrating an example set of data included in the form of a sparse matrix within an optimization database.

DETAILED DESCRIPTION

Figure 1:
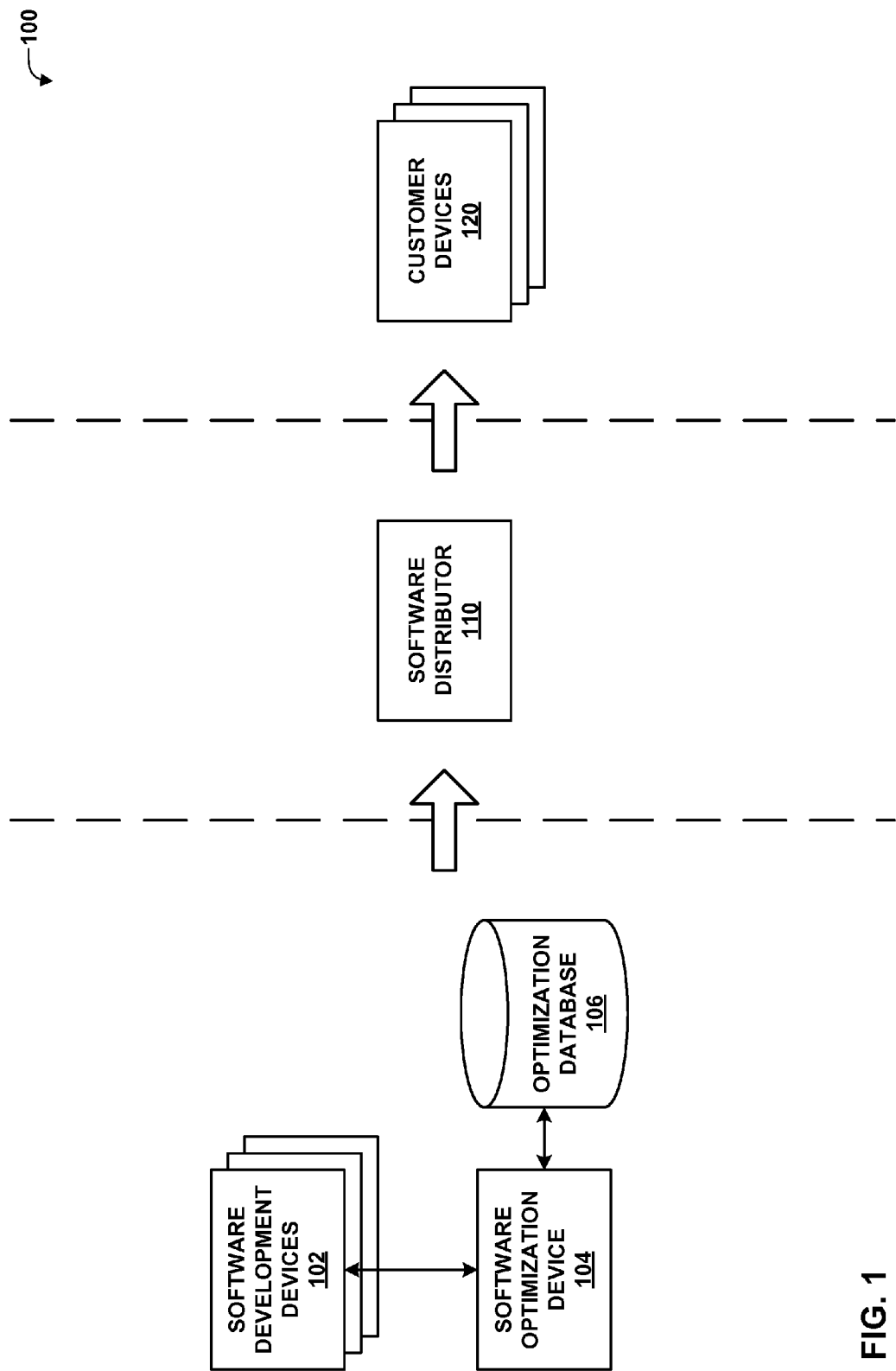
FIG. 1 is a block diagram illustrating an example system in which the techniques of this disclosure may be performed.

In general, this disclosure is directed to techniques for partially or fully automating selection of an optimization strategy for a program. These techniques include using a sparse matrix including performance data for M programs and N optimization strategies. The data in each cell of the matrix (where a cell is an intersection of one of the programs and one of the optimization strategies) may correspond to a rating of the optimization strategy for the corresponding program, i.e., a pair comprising a program and an optimization strategy.

Thus, the matrix represents a collection of data gathered for programs developed using various available optimization strategies. The matrix is sparse because not every optimization strategy is employed for every program. Thus, there will be many cells in the matrix (i.e., intersections of programs and optimization strategies) that do not have corresponding data. Each of these empty cells represents a particular program for which a particular optimization strategy was not employed.

Techniques exist for filling empty cells of a sparse matrix. Devices according to this disclosure may use such techniques, such that the similarities between observed data across programs and optimization strategies are used in collaborative filtering techniques to predict ratings of unobserved pairs. The techniques of this disclosure then include ranking optimization strategies for each program, from best to worst performing.

This disclosure uses the term "optimization strategy" or "optimization" to refer to a full-system state in which an algorithm executes. An optimization strategy may include a large number of options. For example, an optimization strategy may include algorithmic implementation and optimization, such as selection of data structures used in implementation, where such data structures may be, for example, lists or trees used to represent sets of data. An optimization strategy may also include development environment optimization, such as selection of a compiler and its compilation optimizations. For example, a developer may choose between GCC, LLVM, and ICC, and between compilation optimization options of —O3 vs. —O2. Likewise, a developer may choose whether to use one or more specialized code libraries, such as Math Kernel Library (MKL) or GNU Scientific Library (GSL). Furthermore, execution environment may play a role in optimization strategy, such as a scheduling strategy employed within the execution environment, a number of available processing cores, associated with a computing platform, and their execution frequency, memory size, or the like. Moreover, the developer may determine an appropriate execution architecture, such as a central processing unit (CPU), a graphics processing unit (GPU), or a digital signal processor (DSP).

This disclosure also uses the term "rating" to describe an optimization strategy applied to a particular program. That is, the term "rating" is a number associated with a {program, optimization strategy} pair. A rating may account for any or all of completion time for execution of the program, throughput, power consumption, program size, or the like.

In order to deliver acceptable program performance, a program developer selects from among a myriad of optimization strategies. In general, optimization can occur at various levels of program development. Although optimization strategies in isolation, interactions between optimization strategies at various levels of program development are not well documented. This is in part because software, development, execution environment, and hardware are becoming increasingly more complex. Nevertheless, by improving optimization strategies for a particular program (or algorithm), even better performance of that program can be achieved. Better performance may mean, for example, faster completion, lower power consumption, memory consumption, or the like, and/or any combination of such factors.

The techniques of this disclosure include modeling selective prediction of an optimization strategy for a program as a "big data" problem. That is, these techniques include applying collaborative filtering techniques to raw benchmarking pairs. This includes exposing the relationship between {program, optimization strategy} pairs, given a sparse collection of ratings for observed pairs. From the similarity between the observed data across programs and optimization strategies, collaborative filtering techniques are used to predict ratings of unobserved pairs and to rank optimizations per program, from the best to the worst performing. As discussed in greater detail below, these techniques may result in predicting an optimization strategy for a particular program that should yield the best performance results for that program.

FIG. 1 is a block diagram illustrating an example system 100 in which the techniques of this disclosure may be performed. In particular, system 100 includes software development devices 102, software optimization device 104, optimization database 106, software distributor 110, and customer devices 120. Software development devices 102 include software development terminals, testing devices, benchmarking devices, and the like.

In general, a software development entity targets one or more of customer devices 120 for which to develop a particular program. Customer devices 120 may include, for example, desktop computers, laptop computers, mobile devices such as tablets, smartphones, personal digital assistants (PDAs), or any other such computing devices.

A software development entity selects one or more of customer devices 120 for which to develop a piece of software, i.e., a program. The selection may be directed to a particular device or to a class of devices, e.g., devices that implement and execute a particular operating system.

The software development entity may also construct optimization database 106. In general, optimization database 106 includes entries that store ratings for {program, optimization strategy} pairs, as discussed above. For example, optimization database 106 may be realized as a matrix having programs listed in one dimension, optimization strategies listed in another dimension, and cells (i.e., intersections of these dimensions) storing values representative of ratings when a particular optimization strategy has been employed for a particular program. The matrix for optimization database 106 may be sparse, in that not every program will have been optimized using every optimization strategy, and likewise, not every optimization strategy will have been used to optimize every program.

During development of a new program, the software development entity may use software optimization device 104 to determine a recommended optimization strategy for the new program. In general, to determine the recommended optimization strategy, software optimization device 104 predicts values for empty cells of optimization database 106, thereby forming a complete matrix. To fill the empty cells of the sparse matrix, software optimization device 104 may execute a dimensionality reduction algorithm, such as low-rank matrix factorization.

For example, let $R_{M \times N}$ represent a sparse collection of ratings for M programs and N optimization strategies (that is, such that $R_{M \times N}$ approximates the sparse matrix of optimization database 106). Low-rank matrix factorization is a dimensionality reduction strategy which approximates:

$$R_{M \times N} \cong U_{M \times K} \times V_{K \times N} \quad (1)$$

with K<MIN{M, N} being the rank of the approximating matrix. In formula (1), R is an approximating matrix of the original first matrix (e.g., from optimization database 106), K is the rank of matrix R, and U and V are artificial matrices. Ratings for unobserved pairs are modeled as a cross product.

The objective of low-rank matrix factorization is to minimize the following function on the observed data:

$$\min \Sigma_{(i,j) \in O}(r_{i,j} - \Sigma_k u_{i,k} v_{j,k})^2 \quad (2)$$

In formula (2), O represents the set of observed ratings for {program, optimization strategy} pairs from optimization database 106. Efficient optimization is performed with stochastic gradient descent. That is, the following update functions are used:

$$u_{i,k}^{(r+1)} = u_{i,k}^{(r)} + \alpha 2 u_{i,k}^{(r)} e_{i,k}^{(r)} \quad (3)$$

$$v_{k,j}^{(r+1)} = v_{k,j}^{(r)} + \alpha 2 v_{k,j}^{(r)} e_{j,k}^{(r)} \quad (4)$$

In formulas (3) and (4), a represents the rate of convergence. A user, such as a software developer, may provide a number of dimensions and a value for a to software optimization device 104 to use to execute these formulas. Using these values, software optimization device 104 executes formulas (3) and (4) to produce a complete matrix representative of the sparse matrix of optimization database 106, such that each cell of the complete matrix is filled.

After producing the complete matrix, software optimization device 104 determines characteristics of a program, and a target device for the program, to generate a recommended optimization strategy for optimizing the program. For example, by applying the new program (that is, a current program under development) to the complete matrix, along with the characteristics of the program (e.g., target platform for execution and other parameters of interest, i.e., those elements applicable to the program), software optimization device 104 determines a recommended optimization strategy for the new program. In particular, the recommended optimization strategy may include optimization recommendations for each level of development. For example, the recommended optimization strategy may include design-level recommendations such as types of data structures to use for representing various types of data, compiler-level recommendations such as which compiler to select and which compilation optimization settings to use during compilation, or the like.

Software optimization device 104 may provide the recommended optimization strategy to software development devices 102. Alternatively, in some examples, software optimization device 104 is included in the set of software development devices 102. In any case, the software development entity may optimize the new program using the recommended optimization strategy. The software development entity may thus proceed to develop and optimize the program. Moreover, after developing and optimizing the program, the software development entity may update optimization database 106 to describe a rating for the {program, optimization strategy} pair resulting from development and optimization of the new program.

After development and optimization of a program, the software development entity, e.g., using one of software development devices 102, provides the developed program to software distributor 110. This provision may be via a fixed computer-readable storage medium such as a hard disk, a CD-ROM, a flash drive, or the like, or via transmission, e.g., via a local area network, wide area network or the Internet. Software distributor 110 provides the program to customer devices 120, which again may be via distribution of fixed computer-readable storage media and/or via transmission. For example, software distributor 110 may represent an application ("app") store for mobile devices.

Ultimately, users of customer devices 120 may retrieve the program from software distributor 110. The users may install and/or execute the program on respective customer devices 120.

Figure 2:
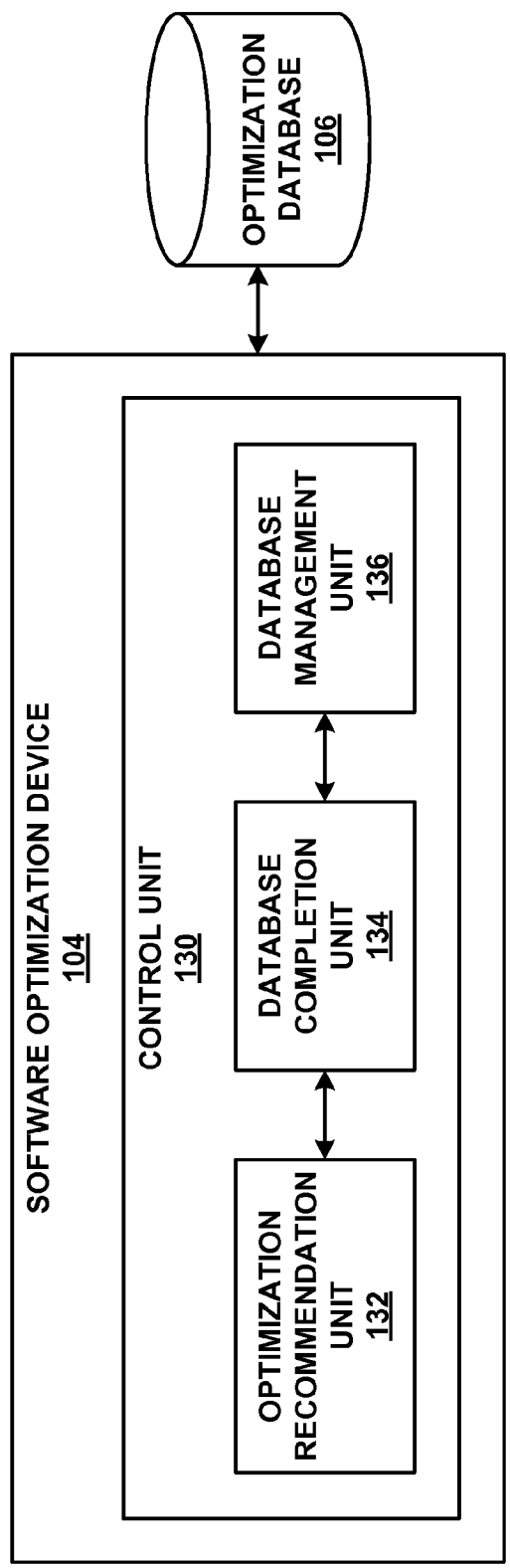
FIG. 2 is a block diagram illustrating an example set of elements that may be included in software optimization device.

FIG. 2 is a block diagram illustrating an example set of elements that may be included in software optimization device 104. In this example, software optimization device 104 includes control unit 130. Control unit 130 may correspond, for example, to one or more processing units configure to perform the functionality attributed to software optimization device 104. For example, control unit 130 may correspond to one or more hardware-based processing units, such as one or more microprocessors, central processing units (CPUs), digital signal processors (DSPs), field-programmable gate arrays (FPGAs), application-specific integrated circuits (ASICs), or any combination thereof or similar processing circuitry. Likewise, control unit 130 may also include computer-readable media, such as data storage media and/or memory, for storing instructions that can be executed by the processing unit(s).

In this example, control unit 130 implements optimization recommendation unit 132, database completion unit 134, and database management unit 136. Database management unit 136 generally interacts with optimization database 106, e.g., storing data to and retrieving data from optimization database 106. Although optimization database 106 is shown as being separate from software optimization device 104, it should be understood that in some examples, optimization database 106 may be stored within a memory of software optimization device 104. Alternatively, software optimization device 104 may include a hardware-based interface to a separately-stored optimization database 106.

Initially, software optimization device 104 may receive values of ratings for {program, optimization strategy} pairs, and database management unit 136 stores these values, as well as indications of the programs and optimization strategies, to optimization database 106. Database management unit 136 may arrange the data within optimization database 106 as a matrix, as discussed above. In response to receipt by software optimization device 104 of a new (that is, current) program for which to provide a recommended optimization strategy, database management unit 136 retrieves data from optimization database 106 for construction of a complete matrix.

Database completion unit 134 represents the unit responsible for producing a complete matrix from sparse entries in a matrix of optimization database 106. That is, database completion unit 134 may execute, e.g., formulas (3) and (4) discussed above when generating the complete matrix. Database completion unit 134 may further receive data indicative of a number of dimensions and a rate of convergence for use when constructing the complete matrix.

After database completion unit 134 fills empty cells of the sparse matrix of optimization database 106 to form a complete matrix, optimization recommendation unit 132 applies the current program to the complete matrix to determine a recommended optimization strategy for the current program. In particular, optimization recommendation unit 132 determines a device (or platform) for which the current program is being developed, features of that device (e.g., available memory size, available processing cores, and the like), and parameters of interest for the current program, and then determines an optimization strategy including a combination of optimizations for various levels of program development such that the combination yields the highest aggregate value (that is, overall highest rating) among other aggregate values from ratings for combinations of optimizations.

More particularly, in some examples, database completion unit 134 adds an entry for the new program into the complete matrix. This entry includes predicted scores for the new program for each of the various optimization strategies. Optimization recommendation unit 132 may then sort the optimization strategies for the new program in order of scores, e.g., highest score to lowest score. Higher ratings may generally correspond to optimization strategies that are predicted to deliver better performance.

After determining the optimization strategy that yields the highest aggregate value for ratings of optimizations, optimization recommendation unit 132 outputs an indication of the recommended optimization strategy for the current program. For example, the indication may comprise a textual and/or graphical representation of the optimization strategy, displayed by software optimization device 104 via a display (not shown) or displayed by one of software development devices 102 (FIG. 1).

Moreover, after the current program has been developed and optimized according to the optimization strategy, software optimization device 104 may receive values for ratings of optimizations included in the optimization strategy. Database management unit 136 may then update optimization database 106 with a value for a rating of the {program, optimization strategy} pair for the current program. In some examples, other optimization strategies may also be attempted, in addition to or in the alternative to the recommended optimization strategy. In such examples, software optimization device 104 may also receive values for ratings of these other {program, optimization strategy} pairs, and update optimization database 106 with each of the ratings for the various pairs.

In this manner, software optimization device 104 represents an example of a device including a memory storing data for a sparse matrix including empty cells and non-empty cells, wherein values of the non-empty cells of the sparse matrix represent ratings for optimization strategies previously applied to programs, and one or more hardware-based processors configured to predict values for empty cells of a sparse matrix, fill the empty cells with the predicted values to produce a complete matrix, determine, for a current program that was not included in the programs of the sparse matrix, a recommended optimization strategy that yields a highest rating from the complete matrix, and provide an indication of the recommended optimization strategy.

FIG. 3 is a block diagram illustrating an example set of data included in the form of a sparse matrix 148 within optimization database 106. In particular, rows of sparse matrix 148 represent various programs 142A-142E (programs 142), while columns of sparse matrix 148 represent optimization strategies 140A-140C (optimization strategies 140) that may be applied to the programs.

A cell occurs at the intersection of each row and column, where the cell may either have one of values 144A-144K (values 144) or be one of empty cells 146A-146L (empty cells 146). Values 144 represent numeric values for ratings resulting from applying the corresponding one of optimization strategies 140 to the corresponding one of programs 142. For example, value 144A includes a numeric value for a rating resulting from applying optimization strategy 140A to program 142A. Thus, cells including one of values 144 represent observed ratings for a {program, optimization strategy} pair, where the program corresponds to one of programs 142 and the optimization strategy corresponds to one of optimization strategies 140 applied to the program.

On the other hand, empty cells 146 represent unobserved {program, optimization strategy} pairs. For example, empty cell 146A indicates that a rating for optimization strategy 140A applied to program 142B has not been observed.

In accordance with the techniques of this disclosure, empty cells 146 may be filled to form a complete matrix from sparse matrix 148. Software optimization device 104 is generally configured to predict values for each of empty cells 146 as discussed above. In particular, software optimization device 104 may model values for empty cells 146 as cross products of matrices formed from sparse matrix 148, e.g., in accordance with formulas (3) and (4) as discussed above.

Figure 4A:
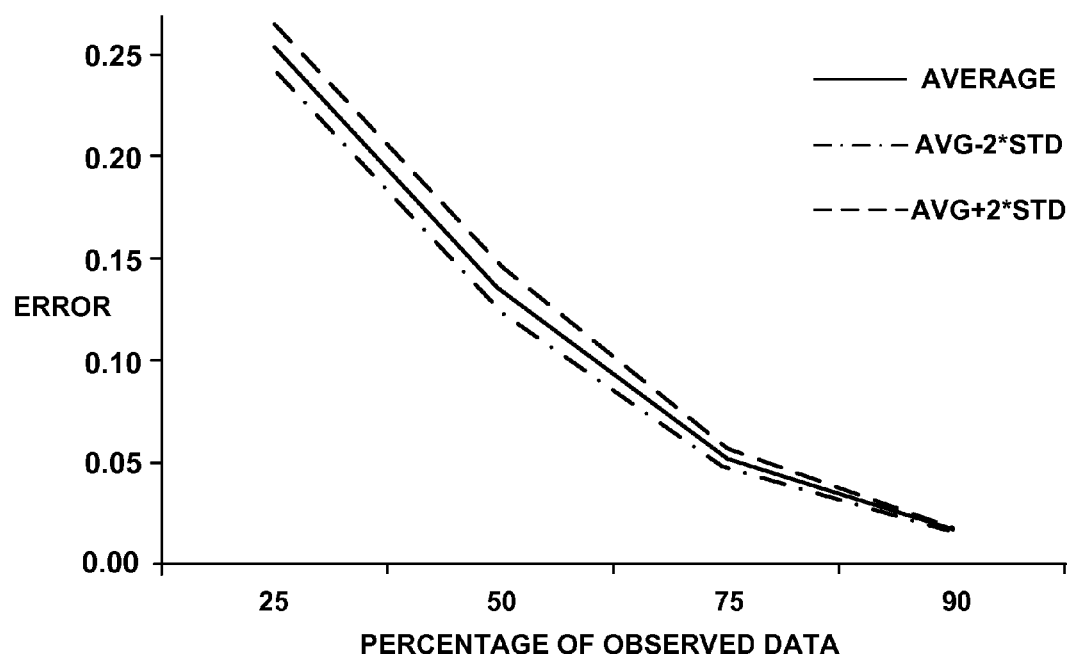
FIGS. 4A and 4B are graphs illustrating heuristic testing results resulting from performance of the techniques of this disclosure.
Figure 4B:
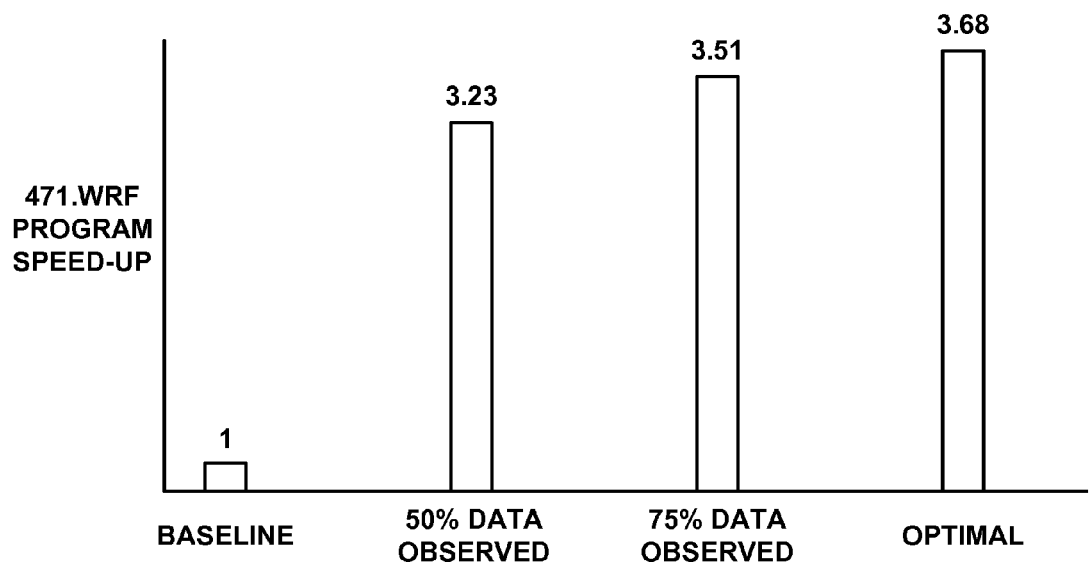

FIGS. 4A and 4B are graphs illustrating heuristic testing results resulting from performance of the techniques of this disclosure. In particular, FIG. 4A is a graph illustrating error results comparative errors resulting from sparsity of a matrix including ratings for {program, optimization strategy} pairs. That is, the error results generally represent measurements of differences between predicted optimization strategies for programs and ideal optimization strategies for those programs. These measurements include average errors, average errors plus two times the standard deviation, and average errors minus two times the standard deviation.

As shown in FIG. 4A, even when the sparse matrix is only 25% full, error measurements are only at approximately 0.25. When the sparse matrix is 50% full, the error rates are approximately 0.13. At 75% full, error rates are at approximately 0.06. At 90% full, error rates are at approximately 0.025. Thus, it can be seen that the techniques of this disclosure can yield predictions with low error rates, even for a very sparse (e.g., 25% full) matrix representing ratings for {program, optimization strategy} pairs.

FIG. 4B is a bar chart illustrating example performance metrics for a program optimized using various recommended optimization strategies according to the techniques of this disclosure. In particular, the program used for testing in this example was a weather and research forecasting (WRF) program, specifically, the "471.WRF" program, which is a common benchmarking program for software optimization testing. In this testing, SPEC CPU2006 benchmarks were used, and compiler heuristics included loop optimizations such as unrolling, fusion and tiling plus auto-parallelization, and auto-vectorization. A baseline was established for this program without optimization, yielding a score of 1. Furthermore, an optimal optimization yielded a score of 3.68. The scores reflect program speed, that is, execution speed of the WRF program.

Various tests were performed using the techniques of this disclosure. In one, the sparse matrix was 50% complete. In this test case, the resulting score was 3.23. In other words, the program was 3.23 times faster than baseline when using a sparse matrix that was 50% complete. In another test, the sparse matrix was 75% complete. In this test case, the resulting score was 3.51. That is, the program was 3.51 times faster than baseline when using a sparse matrix that was 75% complete. Thus, as can be seen from these test results, the techniques of this disclosure can yield very strong recommendations of optimization strategies, even with a sparse matrix including rating values for {program, optimization strategy} pairs.

Figure 5:
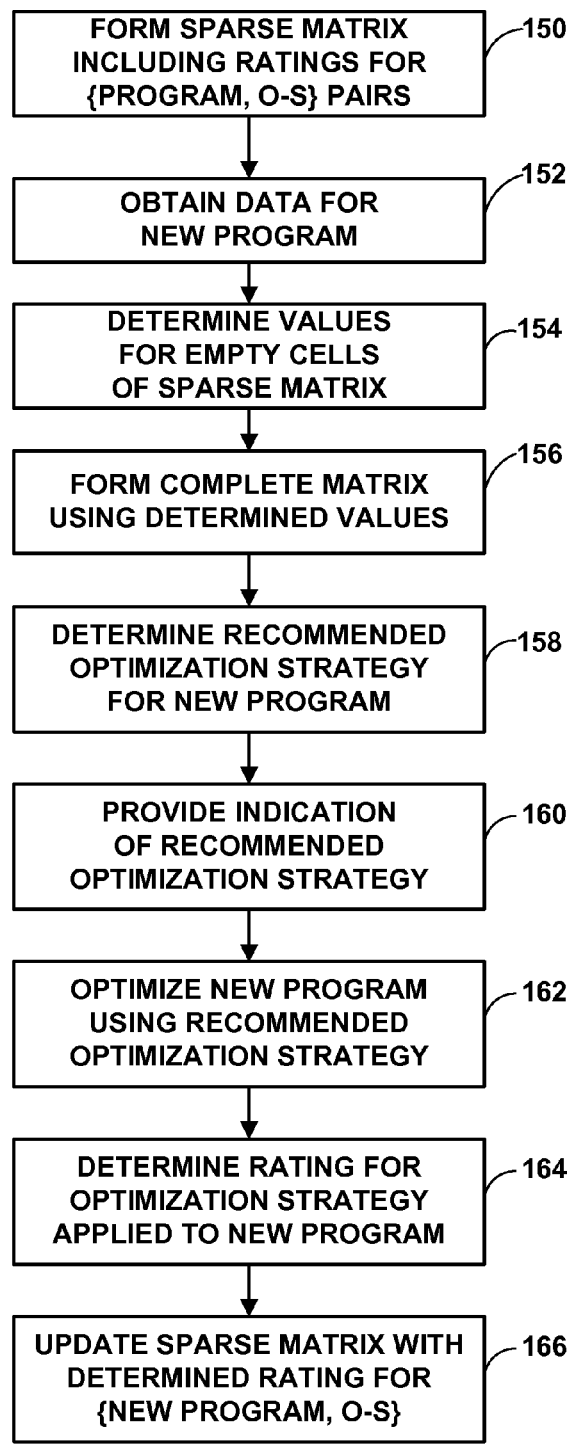
FIG. 5 is a flowchart illustrating an example method for optimizing a program in accordance with the techniques of this disclosure.

FIG. 5 is a flowchart illustrating an example method for optimizing a program in accordance with the techniques of this disclosure. The method of FIG. 5 is explained as being performed by software optimization device 104 (FIGS. 1 and 2). However, it should be understood that other devices (e.g., software development devices 102) of FIG. 1 may perform part or all of this method, alone or in combination with other devices.

Initially, software optimization device 104 forms a sparse matrix including ratings for {program, optimization strategy} pairs (150). For example, database management unit 136 (FIG. 2) may receive values representative of ratings for various observed {program, optimization strategy} pairs and store this data in optimization database 106. Database management unit 136 may thereby form a sparse matrix such as sparse matrix 148 (FIG. 3). Again, the sparse matrix may be considered "sparse" in that the matrix need not include values for each possible {program, optimization strategy} pair. Indeed, the matrix may include relatively few entries, e.g., 25% fill, as shown in FIG. 4A, and still yield acceptable results using the techniques of this disclosure.

Software optimization device 104 then obtains data for a new program (152). For example, software optimization device 104 may receive data indicative of parameters of interest that match parameters of previously analyzed programs for the new program and a value defining a convergence rate. Using this data, software optimization device 104 may determine values for empty cells of the sparse matrix (154). For example, database completion unit 134 may calculate values for empty cells of the sparse matrix, e.g., by executing formulas (3) and (4) above using the rate of convergence received at step (152). Database completion unit 134 may form a complete matrix using the determined values (156) for the empty cells, as well as the existing data of the sparse matrix.

Using the parameters of interest and the complete matrix, software optimization device 104 may determine a recommended optimization strategy for the new program (158). That is, optimization recommendation unit 132 of software optimization device 104 may apply the new program and the parameters of interest for the new program to the complete matrix to determine which combination of optimization strategies for various parameters of interest for the new program yields the highest aggregate rating. Software optimization device 104 may then provide an indication of the recommended optimization strategy (160), e.g., to another device or through output to a user.

Furthermore, a software developer may optimize the new program using the recommended optimization strategy (162). Then, the software developer may determine a rating for the recommended optimization strategy as applied to the new program (164). Software optimization device 104 may then update the sparse matrix with the determined rating for the {new program, recommended optimization strategy} pair (166).

In some examples, the method may include providing indications of a plurality of highly ranked (and, potentially, lowly ranked) optimization strategies for the new program. In these examples, the software developer may test optimizing the new program with the various highly ranked (and in some examples, lowly ranked) optimization strategies, and pick the optimization strategy that yields the best rating. Furthermore, software optimization device 104 may update the sparse matrix with each of the tested optimization strategies for the new program, i.e., adding rating information to empty cells in the matrix.

In this manner, the method of FIG. 5 represents an example of a method including predicting values for empty cells of a sparse matrix, wherein values of non-empty cells of the sparse matrix represent ratings for optimization strategies previously applied to programs, filling the empty cells with the predicted values to produce a complete matrix, determining, for a current program that was not included in the programs of the sparse matrix, a recommended optimization strategy that yields a highest rating from the complete matrix, and providing an indication of the recommended optimization strategy.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of recommending an optimization strategy for software, the method comprising:
predicting values for empty cells of a sparse matrix, wherein values of non-empty cells of the sparse matrix represent ratings for optimization strategies previously applied to programs, wherein a first dimension of the sparse matrix corresponds to the programs, wherein a second dimension of the sparse matrix corresponds to the optimization strategies; and wherein the programs of the sparse matrix each include a plurality of parameters including one or more of run-time features for the corresponding program, compilation settings for a compiler used to compile instructions for the corresponding program, a target platform for executing the corresponding program, a number of processing cores available for the target platform, or a memory size for the target platform;
filling the empty cells with the predicted values to produce a complete matrix;
determining, for a current program that was not included in the programs of the sparse matrix, a recommended optimization strategy that yields a highest rating from the complete matrix, wherein determining the recommended optimization strategy comprises determining ratings for one or more of the plurality of parameters that are applicable to the current program; and
optimizing the current program using the recommended optimization strategy.

2. The method of claim 1, wherein determining the recommended optimization strategy comprises determining one of the optimization strategies that yields a highest rating for the current program.

3. The method of claim 1, further comprising constructing the sparse matrix, wherein constructing the sparse matrix comprises:
receiving indications of the programs included in the sparse matrix;
receiving indications of the optimization strategies applied to the programs included in the sparse matrix;
receiving the ratings for the optimization strategies as applied to the programs; and
constructing the sparse matrix such that cells of the sparse matrix correspond to intersections of the programs and the optimization strategies, and such that the non-empty cells include one of the ratings for the corresponding one of the optimization strategies applied to the corresponding one of the programs.

4. The method of claim 1, wherein filling the empty cells comprises executing a dimensionality reduction algorithm on the sparse matrix to produce the complete matrix.

5. The method of claim 4, wherein executing the dimensionality reduction algorithm comprises performing low-rank matrix factorization on the sparse matrix to produce the complete matrix.

6. The method of claim 1, wherein determining the recommended optimization strategy comprises determining a plurality of recommended optimization strategies, and wherein providing the indication of the recommended optimization strategy comprises providing indications of the plurality of recommended optimization strategies.

7. The method of claim 1, further comprising, after optimizing the current program using the recommended optimization strategy, updating the sparse matrix to include one or more entries for the current program and the recommended optimization strategy.

8. A device for recommending an optimization strategy for software, the device comprising:
a memory storing data for a sparse matrix including empty cells and non-empty cells, wherein values of the non-empty cells of the sparse matrix represent ratings for optimization strategies previously applied to programs, wherein a first dimension of the sparse matrix corresponds to the programs, wherein a second dimension of the sparse matrix corresponds to the optimization strategies; and wherein the programs of the sparse matrix each include a plurality of parameters including one or more of run-time features for the corresponding program, compilation settings for a compiler used to compile instructions for the corresponding program, a target platform for executing the corresponding program, a number of processing cores available for the target platform, or a memory size for the target platform; and
one or more hardware-based processors configured to:
predict values for empty cells of a sparse matrix,
fill the empty cells with the predicted values to produce a complete matrix,
determine, for a current program that was not included in the programs of the sparse matrix, a recommended optimization strategy that yields a highest rating from the complete matrix, wherein to determine the recommended optimization strategy, the one or more hardware-based processors are configured to determine ratings for one or more of the plurality of parameters that are applicable to the current program, and
optimizing the current program using the recommended optimization strategy.

9. The device of claim 8, wherein to determine the recommended optimization strategy, the one or more hardware-based processors are configured to determine one of the optimization strategies that yields a highest rating for the current program.

10. The device of claim 8, wherein the one or more hardware-based processors are further configured to:
receive indications of the programs included in the sparse matrix;
receive indications of the optimization strategies applied to the programs included in the sparse matrix;
receive the ratings for the optimization strategies as applied to the programs; and
construct the sparse matrix such that cells of the sparse matrix correspond to intersections of the programs and the optimization strategies, and such that the non-empty cells include one of the ratings for the corresponding one of the optimization strategies applied to the corresponding one of the programs.

11. The device of claim 8, wherein to fill the empty cells, the one or more hardware-based processors are configured to execute a dimensionality reduction algorithm on the sparse matrix to produce the complete matrix.

12. The device of claim 11, wherein to execute the dimensionality reduction algorithm, the one or more hardware-based processors are configured to perform low-rank matrix factorization on the sparse matrix to produce the complete matrix.

13. The device of claim 8, wherein the one or more hardware-based processors are further configured to determine a plurality of recommended optimization strategies, and to provide indications of the plurality of recommended optimization strategies.

14. The device of claim 8, the one or more hardware-based processors are further configured to, after optimizing the current program using the recommended optimization strategy, update the sparse matrix to include one or more entries for the current program and the recommended optimization strategy.

15. A device for recommending an optimization strategy for software, the device comprising:
means for predicting values for empty cells of a sparse matrix, wherein values of non-empty cells of the sparse matrix represent ratings for optimization strategies previously applied to programs, wherein a first dimension of the sparse matrix corresponds to the programs, wherein a second dimension of the sparse matrix corresponds to the optimization strategies, and wherein the programs of the sparse matrix each include a plurality of parameters including one or more of run-time features for the corresponding program, compilation settings for a compiler used to compile instructions for the corresponding program, a target platform for executing the corresponding program, a number of processing cores available for the target platform, or a memory size for the target platform;
means for filling the empty cells with the predicted values to produce a complete matrix;
means for determining, for a current program that was not included in the programs of the sparse matrix, a recommended optimization strategy that yields a highest rating from the complete matrix, wherein the means for determining the recommended optimization strategy comprises means for determining ratings for one or more of the plurality of parameters that are applicable to the current program; and
means for optimizing the current program using the recommended optimization strategy.

16. The device of claim 15, wherein the means for determining the recommended optimization strategy comprises means for determining one of the optimization strategies that yields a highest rating for the current program.

17. The device of claim 15, further comprising means for constructing the sparse matrix, comprising:
means for receiving indications of the programs included in the sparse matrix;
means for receiving indications of the optimization strategies applied to the programs included in the sparse matrix;
means for receiving the ratings for the optimization strategies as applied to the programs; and
means for constructing the sparse matrix such that cells of the sparse matrix correspond to intersections of the programs and the optimization strategies, and such that the non-empty cells include one of the ratings for the corresponding one of the optimization strategies applied to the corresponding one of the programs.

18. The device of claim 15, wherein the means for filling the empty cells comprises means for performing low-rank matrix factorization on the sparse matrix to produce the complete matrix.

19. The device of claim 15, further comprising means for updating the sparse matrix to include one or more entries for the current program and the recommended optimization strategy after optimizing the current program using the recommended optimization strategy.

20. A computer-readable storage medium having stored thereon instructions that, when executed, cause a processor to:
predict values for empty cells of a sparse matrix, wherein values of non-empty cells of the sparse matrix represent ratings for optimization strategies previously applied to programs, wherein a first dimension of the sparse matrix corresponds to the programs, wherein a second dimension of the sparse matrix corresponds to the optimization strategies, and wherein the programs of the sparse matrix each include a plurality of parameters including one or more of run-time features for the corresponding program, compilation settings for a compiler used to compile instructions for the corresponding program, a target platform for executing the corresponding program, a number of processing cores available for the target platform, or a memory size for the target platform;
fill the empty cells with the predicted values to produce a complete matrix;
determine, for a current program that was not included in the programs of the sparse matrix, a recommended optimization strategy that yields a highest rating from the complete matrix, wherein the instructions that cause the processor to determine the recommended optimization strategy comprise instructions that cause the processor to determine ratings for one or more of the plurality of parameters that are applicable to the current program; and
optimize the current program using the recommended optimization strategy.

21. The computer-readable storage medium of claim 20, wherein the instructions that cause the processor to determine the recommended optimization strategy comprise instructions that cause the processor to determine one of the optimization strategies that yields a highest rating for the current program.

22. The computer-readable storage medium of claim 20, further comprising instructions that cause the processor to construct the sparse matrix, comprising instructions that cause the processor to:
receive indications of the programs included in the sparse matrix;
receive indications of the optimization strategies applied to the programs included in the sparse matrix;
receive the ratings for the optimization strategies as applied to the programs; and
construct the sparse matrix such that cells of the sparse matrix correspond to intersections of the programs and the optimization strategies, and such that the non-empty cells include one of the ratings for the corresponding one of the optimization strategies applied to the corresponding one of the programs.

23. The computer-readable storage medium of claim 20, wherein the instructions that cause the processor to fill the empty cells comprise instructions that cause the processor to perform low-rank matrix factorization on the sparse matrix to produce the complete matrix.

24. The computer-readable storage medium of claim 20, further comprising instructions that cause the processor to update the sparse matrix to include one or more entries for the current program and the recommended optimization strategy after optimizing the current program using the recommended optimization strategy.

* * * * *